(12) United States Patent
Tsuda et al.

(10) Patent No.: US 11,496,026 B2
(45) Date of Patent: Nov. 8, 2022

(54) STATOR MANUFACTURING METHOD AND STATOR

(71) Applicants: AISIN CORPORATION, Kariya (JP); AISIN SEIKI KABUSHIKI KAISHA, Kariya (JP)

(72) Inventors: Teppei Tsuda, Nagoya (JP); Masafumi Sakuma, Chiryu (JP)

(73) Assignees: AISIN CORPORATION, Kariya (JP); AISIN SEIKI KABUSHIKI KAISHA, Kariya (JP)

( * ) Notice: Subject to any disclaimer, the term of this patent is extended or adjusted under 35 U.S.C. 154(b) by 213 days.

(21) Appl. No.: 16/768,908

(22) PCT Filed: Jan. 7, 2019

(86) PCT No.: PCT/JP2019/000048
§ 371 (c)(1),
(2) Date: Jun. 2, 2020

(87) PCT Pub. No.: WO2019/142663
PCT Pub. Date: Jul. 25, 2019

(65) Prior Publication Data
US 2021/0167674 A1 Jun. 3, 2021

(30) Foreign Application Priority Data
Jan. 18, 2018 (JP) .............................. JP2018-006314

(51) Int. Cl.
*H02K 1/16* (2006.01)
*H02K 15/02* (2006.01)
*H02K 15/06* (2006.01)

(52) U.S. Cl.
CPC .......... *H02K 15/024* (2013.01); *H02K 1/165* (2013.01); *H02K 15/064* (2013.01); *H02K 2201/06* (2013.01)

(58) Field of Classification Search
CPC ........ H02K 15/024; H02K 1/18; H02K 1/165; H02K 15/04; H02K 1/16; H02K 15/064; H02K 3/12
See application file for complete search history.

(56) References Cited

U.S. PATENT DOCUMENTS 7,531,936 B2    5/2009  Fukasaku et al.
9,941,764 B2 *  4/2018  Huber ..................... H02K 3/34
(Continued)

FOREIGN PATENT DOCUMENTS

JP    S54-155405 A      12/1979
JP      55053157 A  *    4/1980
(Continued)

OTHER PUBLICATIONS

JP-55053157-A machine translation on Feb. 26, 2022.*
(Continued)

*Primary Examiner* — Leda T Pham
(74) *Attorney, Agent, or Firm* — Oliff PLC

(57) ABSTRACT

This stator manufacturing method includes a step in which one of a skew-forming mechanism portion and a skew-forming jig presses, with the skew-forming jig, the skew-forming mechanism portion having a shape corresponding to the shape of a skew, to form a skew having a bent shape or a curved shape.

10 Claims, 12 Drawing Sheets

(56) References Cited

U.S. PATENT DOCUMENTS

| | | | |
|---|---|---|---|
| 2009/0230801 A1 | 9/2009 | Yamada | |
| 2011/0133580 A1* | 6/2011 | Sugimoto | ............... B60L 15/20 |
| | | | 310/54 |
| 2012/0007465 A1* | 1/2012 | Fargo | .................... H02K 1/165 |
| | | | 310/216.069 |

FOREIGN PATENT DOCUMENTS

| JP | S55-53157 A | 4/1980 |
|---|---|---|
| JP | H9-168264 A | 6/1997 |
| JP | H11-225461 A | 8/1999 |
| JP | 2003-18802 A | 1/2003 |
| JP | 2005-143214 A | 6/2005 |
| JP | 2012-196033 A | 10/2012 |
| JP | 6111135 B2 | 4/2017 |

OTHER PUBLICATIONS

Dec. 18, 2020 European Search Report issued in European Patent Application No. 19741315.6.
Translation of Japanese Patent Publication JP-S55-53157A.
Corrected English language version of Mar. 26, 2019 International Search Report issued in International Patent Application No. PCT/JP2019/000048.
Jun. 3, 2020 Communication in Cases for Which No Other Form Is Applicable issued in International Patent Application No. PCT/JP2019/000048.
Mar. 26, 2019 International Search Report issued in Internaitonal Patent Application No. PCT/JP2019/000048.

* cited by examiner

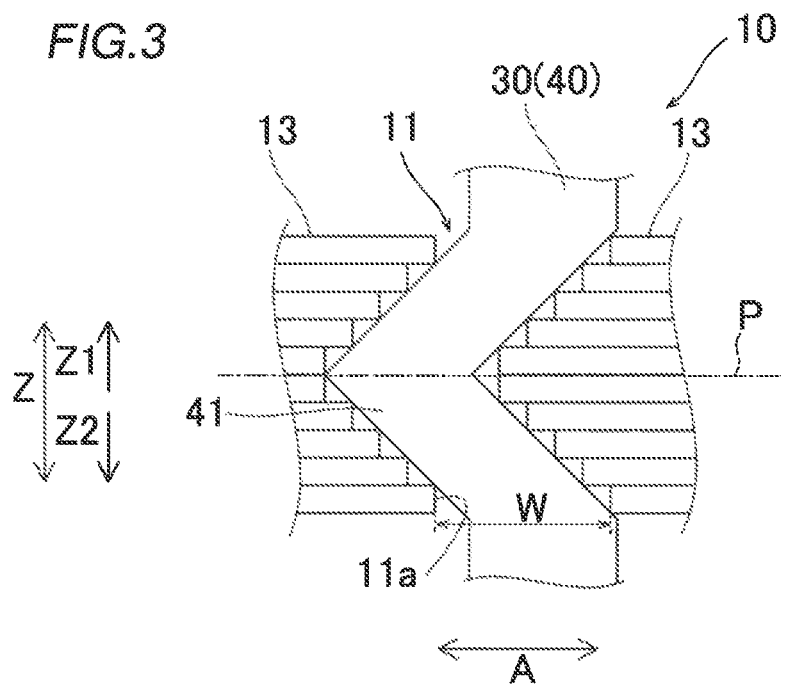
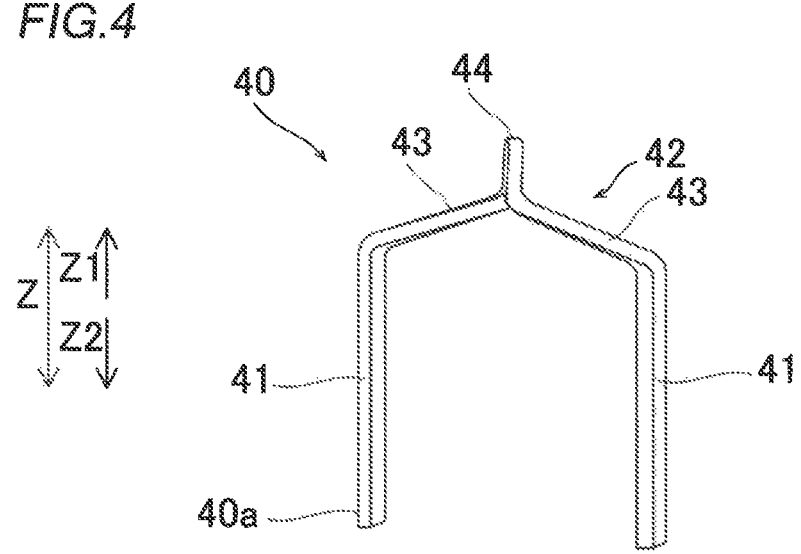

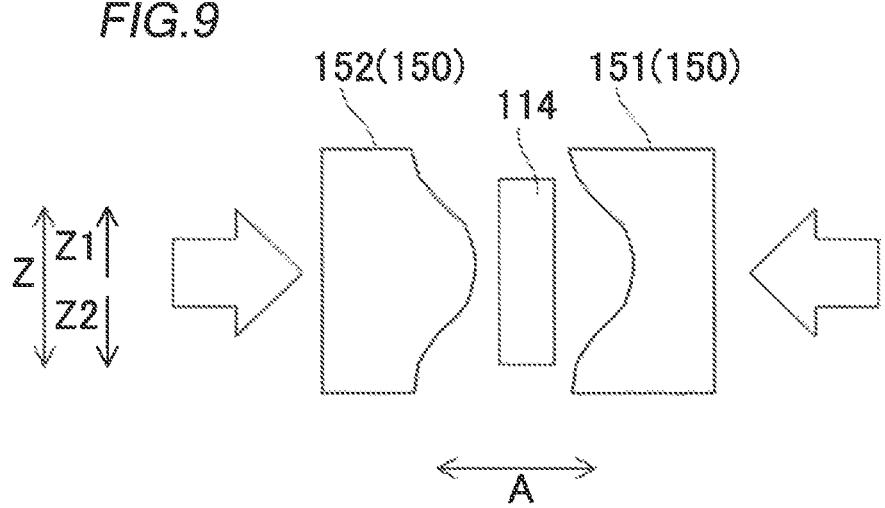
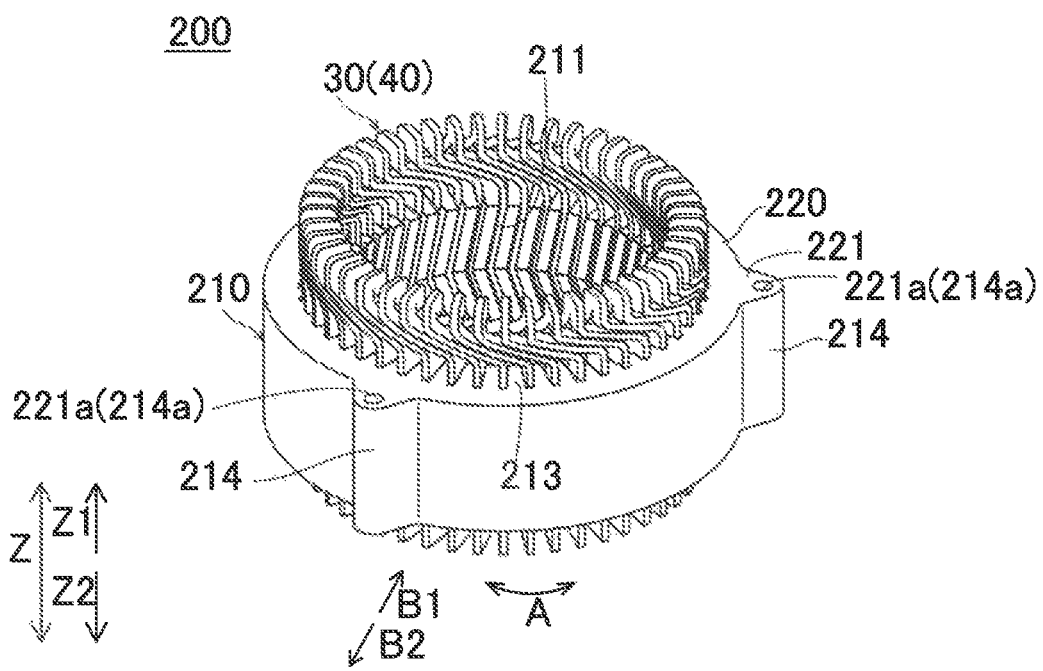

STATOR MANUFACTURING METHOD AND STATOR

TECHNICAL FIELD

The preferred embodiment relates to a stator manufacturing method and a stator.

BACKGROUND ART

A stator manufacturing method that includes a step of forming a skew on a stator core is known. This type of stator is disclosed in, for example, Japanese Unexamined Patent Application Publication No. 2012-196033 (JP 2012-196033 A).

JP 2012-196033 A discloses a method of manufacturing a skewed stator. In this method of manufacturing a skewed stator, a stator core is formed first by stacking multiple magnetic metal pieces. Then, an annular coil is mounted in slots (spaces, between adjacent teeth, for coil placement) in the stator core. Further, a groove-shaped cutout is provided in the outer circumferential surface of the stator core along the axial direction. The groove-shaped cutout is provided linearly along the axial direction. Next, a rod-shaped pin extending linearly along the axial direction is placed in the groove-shaped cutout. After that, the rod-shaped pin in the groove-shaped cutout is inclined with respect to the axis of rotation. This gradually displaces the multiple magnetic metal pieces from each other in the circumferential direction, thus forming a skew on the stator core. It is noted that the expression "forming a skew" means applying a circumferential twist to the stator core.

Specifically, the magnetic metal pieces that are located on the upper side (one side in the axial direction) of the stator core are gradually moved toward one side in the circumferential direction as the inclination of the rod-shaped pin increases. On the other hand, the magnetic metal pieces that are located on the lower side (the other side in the axial direction) of the stator core are gradually moved toward the other side in the circumferential direction as the inclination of the rod-shaped pin increases. The amount of movement of the magnetic metal pieces in the circumferential direction increases with decreasing distance to the ends of the stator core in the axial direction. That is, the amount of movement of the magnetic metal pieces in the circumferential direction decreases with decreasing distance to the center of the stator core in the axial direction. As a result, the stack of multiple magnetic metal pieces that structures the stator core is skewed (linearly) to incline with respect to the axis of rotation.

When the stator core is skewed, the slots are also linearly inclined with respect to the axial direction. Further, slot-held portions of the coil mounted in the slots (portions of the coil that are mounted in the slots) are linearly inclined with respect to the axial direction in the same manner as the slots. Thus, a change in electromagnetic force becomes small (the change is mitigated), and motor vibration and noise become small accordingly. Specifically, motor vibration in a direction along the circumferential direction or the radial direction becomes small.

RELATED ART DOCUMENTS

Patent Documents

Patent Document 1: Japanese Unexamined Patent Application Publication No. 2012-196033 (JP 2012-196033 A)

SUMMARY

Problem to be Solved

However, in JP 2012-196033 A, since the slot-held portions are linearly inclined with respect to the axial direction, the magnitude of electromagnetic force applied from one end of the slot-held portion to a magnetic pole of the motor may differ from the magnitude of electromagnetic force applied from the other end of the slot-held portion to the magnetic pole of the motor (the magnitudes may become unbalanced). Therefore, there is a problem in that the motor may vibrate in a direction along the axial direction.

The preferred embodiment addresses a problem like the one described above. One purpose of the preferred embodiment is to provide a stator manufacturing method and a stator capable of reducing vibration in a direction along an axial direction, in addition to vibration in a direction along a circumferential direction or a radial direction.

Means for Solving the Problem

In order to achieve the above purpose, a first aspect provides a stator manufacturing method including: a step of forming a stator core by stacking multiple electrical steel sheets; a step of mounting a coil in slots of the stator core; and a step of forming a skew having a bent shape or a curved shape such that the multiple electrical steel sheets structuring the stator core are gradually displaced from each other in a circumferential direction, by pressing, after the coil is mounted in the slots of the stator core, a skew-forming mechanism portion provided on an outer circumferential surface or an inner circumferential surface of the stator core with a skew-forming jig, wherein one of the skew-forming mechanism portion and the skew-forming jig has a bent shape or a curved shape to correspond to the shape of the skew.

In the stator manufacturing method according to the first aspect, as described above, the skew-forming mechanism portion is pressed by the skew-forming jig after the coil is mounted in the slot of the stator core. Thus, since one of the skew-forming mechanism portion and the skew-forming jig has a bent shape or a curved shape corresponding to the shape of a skew, multiple electrical steel sheets that structure the stator core are gradually displaced from each other in the circumferential direction in a bent shape or a curved shape to follow the bent shape or the curved shape of the one of the skew-forming mechanism portion and the skew-forming jig. As a result, a bent or curved skew is formed on the stator core. Accordingly, the slots and the coil mounted in the slots are also deformed in a bent shape or a curved shape to correspond to the skew on the stator core. This allows both ends on one side and the other side of slot-held portions to be located on the same side in the circumferential direction, thus making it possible to reduce a difference in magnitude between electromagnetic force from one end of the slot-held portions and electromagnetic force from the other end of the slot-held portions in the axial direction. Therefore, vibration in a direction along the axial direction is reduced. Further, since a bent or curved skew is formed on the stator core, a change in electromagnetic force to the slot-held portions in the circumferential direction is smaller than when the slot-held portions of the coil are mounted along the axial direction (when no skew is formed). Therefore, vibration in a direction along the circumferential direction or the radial direction is reduced. From these results, it is possible to reduce vibration in a direction along the axial direction, in addition to vibration in a direction along the circumferential direction or the radial direction.

A second aspect provides a stator including: a stator core having a stack of multiple electrical steel sheets; and a coil mounted in slots of the stator core, wherein the slots formed in the stator core have a skew shape that is bent or curved such that the multiple electrical steel sheets are displaced from each other in a circumferential direction, an outer circumferential surface or an inner circumferential surface of the stator core is provided with a skew-forming mechanism portion, the skew-forming mechanism portion has a bent shape or a curved shape corresponding to the skew shape before the multiple electrical steel sheets are displaced from each other in the circumferential direction, and the skew-forming mechanism portion has a linear shape along an axial direction after the multiple electrical steel sheets are displaced from each other in the circumferential direction.

In the stator according to the second aspect, as described above, the outer circumferential surface or the inner circumferential surface of the stator core is provided with the skew-forming mechanism portion that has a bent shape or a curved shape corresponding to the shape of the skew before the multiple electrical steel sheets are displaced from each other in the circumferential direction. Thus, as the skew-forming mechanism portion having the bent shape or the curved shape is deformed in a linear shape along the axial direction, the multiple electrical steel sheets structuring the stator core are gradually displaced from each other in the circumferential direction in a bent shape or a curved shape to follow the bent shape or the curved shape of the skew-forming mechanism portion. As a result, a bent or curved skew is formed on the stator core. Accordingly, the slots and the coil mounted in the slots are also deformed in a bent shape or a curved shape to correspond to the skew on the stator core. This allows both ends on one side and the other side of slot-held portions to be located on the same side in the circumferential direction, thus making it possible to reduce a difference in magnitude between electromagnetic force from one end of the slot-held portions and electromagnetic force from the other end of the slot-held portions in the axial direction. Therefore, vibration in a direction along the axial direction is reduced. Further, since a bent or curved skew is formed on the stator core, a change in electromagnetic force to the slot-held portions in the circumferential direction is smaller than when the slot-held portions of the coil are mounted along the axial direction (when no skew is formed). Therefore, vibration in a direction along the circumferential direction or the radial direction is reduced. From these results, it is possible to provide a stator that is capable of reducing vibration in a direction along the axial direction, in addition to vibration in a direction along the circumferential direction or the radial direction.

Effects

As described above, the preferred embodiment is capable of reducing vibration in a direction along the axial direction, in addition to vibration in a direction along the circumferential direction or the radial direction.

BRIEF DESCRIPTION OF THE DRAWINGS

FIG. 3 is a schematic diagram of a coil mounted in a slot according to the first embodiment.

FIG. 4 is a perspective view of a segment conductor according to the first embodiment.

FIG. 9 is a diagram explaining a stator manufacturing method according to the second embodiment.

FIG. 10 is a perspective view of a stator according to a third embodiment.

BEST MODES

Embodiments of the preferred embodiment are described below with reference to the drawings.

[First Embodiment]

(Stator Structure)

With reference to FIGS. 1 to 4, the structure of a stator 1 according to the first embodiment is described.

Figure 1:
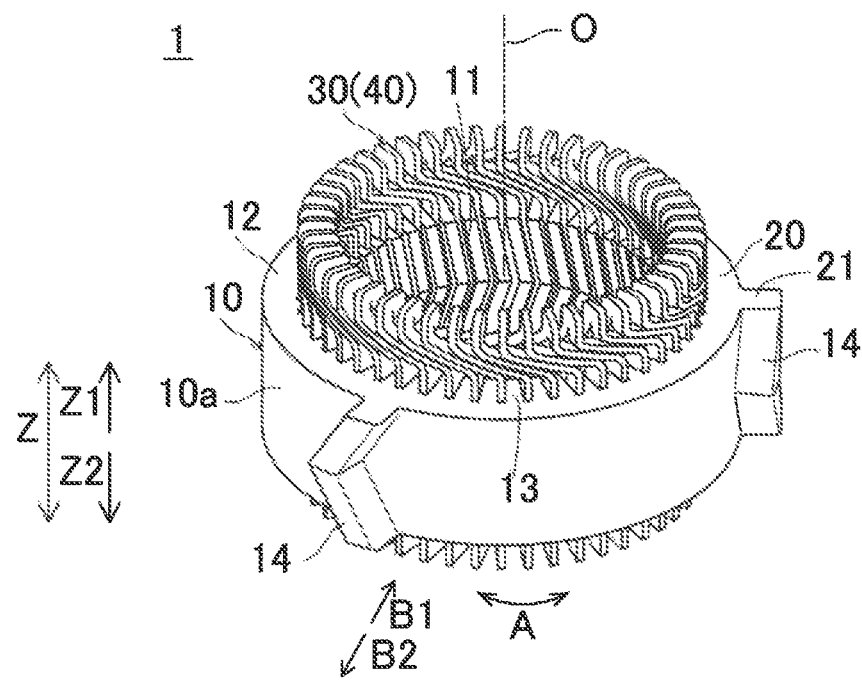
FIG. 1 is a perspective view of a stator according to a first embodiment.
Figure 2:
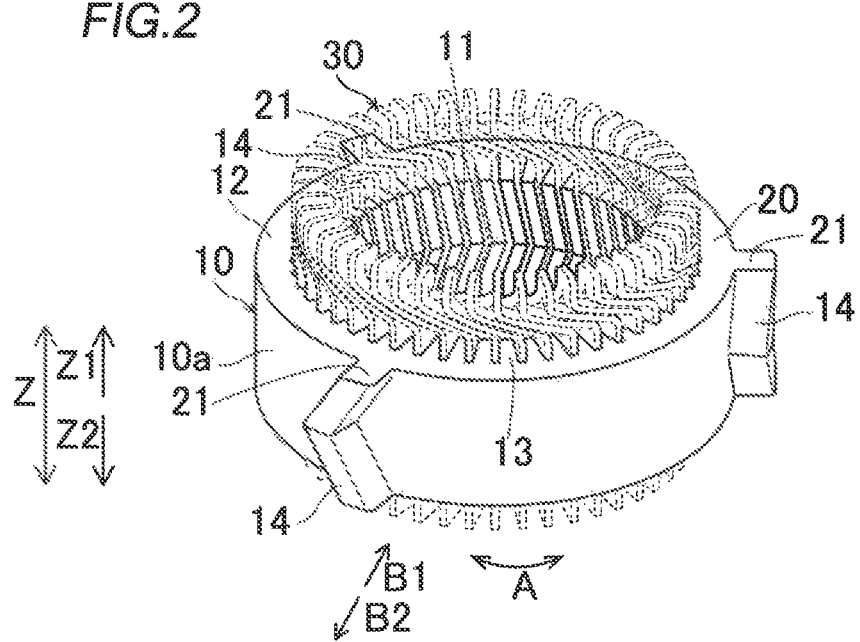
FIG. 2 is a perspective view of a stator core (electrical steel sheets) according to the first embodiment.

As illustrated in FIG. 1, according to the present specification, the term "axial direction" refers to directions along the axis of rotation (a symbol O) (Z-directions) of a stator core 10 (a rotor). Further, the term "circumferential direction" refers to circumferential directions (A-directions) of the stator core 10. Further, the terms "radially inside" and "inner diameter side" refer to a direction toward the center of the stator core 10 (a direction indicated by an arrow B1). Further, the terms "radially outside" and "outer diameter side" refer to a direction toward the outside of the stator core 10 (a direction indicated by an arrow B2).

As illustrated in FIG. 1, the stator 1 includes the stator core 10 that is annular in shape. For example, the stator 1 structures part of an inner-rotor-type rotating electric machine, and the stator core 10 is located to face a rotor core (not illustrated) in the radial direction.

The stator core 10 is formed by stacking multiple electrical steel sheets 20. The stator core 10 includes the following: a back yoke 12 that joins together radially outside portions of slots 11 in an annular shape; and multiple teeth 13 that are each provided adjacent ones of the slots 11 and that extend radially inside from the back yoke 12. Further, insulation members (not illustrated) are located in the slots 11 to insulate a coil 30 from the stator core 10. The specific structures of the electrical steel sheets 20, the slot 11, and the coil 30 are described below.

The multiple electrical steel sheets 20 have the same shape as each other. Specifically, the electrical steel sheets 20 include ear portions 21 that protrude toward the outer diameter side. The number of ear portions 21 provided is three (refer to FIG. 2). The three ear portions 21 are spaced from each other at equal angular intervals (of 120 degrees). The ear portions 21 are each rectangular in shape when viewed from the axial direction. The ear portions 21 structure protrusion portions 14 that are described later. The electrical steel sheets 20 are formed by being punched out from a strip of electrical steel. That is, the multiple electrical steel sheets 20 having the same shape as each other are formed by the same process (punches that are identical in shape).

According to the first embodiment, as illustrated in FIG. 3, the multiple electrical steel sheets 20, which structure the stator core 10, are gradually displaced from each other in the circumferential direction so as to form a skew having a bent shape on the stator core 10. That is, a twist is applied to the stator core 10 in the circumferential direction. Specifically, although the multiple electrical steel sheets 20, which structure the stator core 10, have the same shape as each other, gradually displacing the multiple electrical steel sheets 20 in the circumferential direction forms a skew (a twist) on the stator core 10. The electrical steel sheets 20 that are arranged on one side in the axial direction (on a Z1-direction side) are gradually displaced from each other in one circumferential direction. The electrical steel sheets 20 that are arranged on the other side in the axial direction (on a Z2-direction side) are also gradually displaced from each other in one circumferential direction. The amount of displacement of the electrical steel sheets 20 in the circumferential direction increases with decreasing distance to the ends thereof in the axial direction and decreases with decreasing distance to the center. Thus, a skew having a V-shape is formed on the electrical steel sheets 20. It is noted that the "V-shape" is a V-shape when viewed in the radial direction. That is, the "V-shape" is a V-shape projecting in the circumferential direction.

As illustrated in FIG. 1, an outer circumferential surface 10a of the stator core 10 is provided with the protrusion portions 14. The protrusion portions 14 are structured by staking the ear portions 21 of the multiple electrical steel sheets 20. The protrusion portions 14 are formed to protrude radially outside from the outer circumferential surface 10a of the stator core 10. Three protrusion portions 14 are provided (refer to FIG. 2) corresponding to the multiple (three) ear portions 21. The protrusion portions 14 has a linear shape along the axial direction before the multiple electrical steel sheets 20 are gradually displaced from each other in the circumferential direction, and has a bent shape corresponding to the skew after the multiple electrical steel sheets 20 are gradually displaced from each other in the circumferential direction as illustrated in FIG. 1. The protrusion portions 14 refer to portions that are pressed, when a skew is formed on the stator core 10, by a skew forming jig 50 that is described later to form the skew. A method of forming the skew (a method of manufacturing the stator 1) is described later. The protrusion portions 14 are one example of a "skew forming mechanism portion" recited in the claims.

Further, as illustrated in FIG. 3, the slots 11 and the teeth 13 of the stator core 10 each have a bent shape corresponding to the skew on the stator core 10. Specifically, the slots 11 and the teeth 13 of the stator core 10 each have a V-shape (a V-shape projecting in the circumferential direction) when viewed in the radial direction of the stator core 10. That is, since the multiple electrical steel sheets 20, which structure the stator core 10, are gradually displaced in the circumferential direction so as to form a skew having a bent shape on the stator core 10, the slots 11 and the teeth 13 are formed to have a bent shape corresponding to the skew on the stator core 10. A width W of the slots 11 (the width of the teeth 13) in the circumferential direction is constant along the axial direction. This allows segment conductors 40 that are structured from flat conductive wires 40a (rectangular wires having a substantially constant width) as described later to be mounted in the slots 11.

In FIG. 3, a side wall 11a of each of the slots 11 is illustrated to have a stepped shape. However, since the thickness of the electrical steel sheet 20 is very small (thin) relative to the length of the stator core 10 in the axial direction, the side wall 11a of the slot 11 has a shape similar to a flat surface.

As illustrated in FIG. 1, the coil 30 is mounted to the stator 1. As illustrated in FIG. 4, the coil 30 is structured from multiple segment conductors 40 that are held in the multiple slots 11. The segment conductor 40 (a SC coil) refers to a coil structured from a conductive wire (a flat conductive wire 40a) that is formed in a substantially U-shape and that has a rectangular cross section. Each of the multiple segment conductors 40 (flat conductive wires 40a) is covered with an insulation coating that is not illustrated. Structuring the coil 30 from the flat conductive wires 40a makes it possible to increase the space factor in the slots 11 and thus to improve motor performance (to reduce motor size).

The segment conductor 40 includes a pair of slot-held portions 41 each inserted in a different one of the slots 11. As illustrated in FIG. 4, the slot-held portions 41 before the skew is formed are linear in shape. On the other hand, the slot-held portions 41 after the skew is formed (refer to FIG. 3) have a bent shape corresponding to a bent shape of the skew of the stator core 10. Specifically, the slot-held portions 41 each have a V-shape (a V-shape projecting in the circumferential direction) when viewed in the radial direction of the stator core 10. That is, since the multiple electrical steel sheets 20, which structure the stator core 10, are gradually displaced in the circumferential direction so as to form a skew having a bent shape on the stator core 10, the slot-held portions 41 mounted to the stator core 10 are pressed by the electrical steel sheets 20 in the circumferential direction and thereby deformed into a bent shape corresponding to the skew on the stator core 10. The V-shape of the slot-held portion 41 is symmetric with respect to a line segment P (refer to FIG. 3) that is perpendicular to the axial direction.

Further, the segment conductor 40 includes a coil end portion 42 that connects together one-side (Z1-direction-side) ends of the pair of slot-held portions 41. The coil end portion 42 includes a pair of shoulder portions 43 joined to the pair of slot-held portions 41, and a head portion 44 that connects together the pair of shoulder portions 43. One of the pair of shoulder portions 43 is provided to extend from the head portion 44 toward one side along the circumferential direction, and the other of the pair of shoulder portions 43 is provided to extend from the head portion 44 toward the other side along the circumferential direction. In FIG. 4, the other-side (Z2-direction-side) ends of the slot-held portion 41 are structured to extend along the axial direction without being connected to any other portion. However, after the segment conductors 40 are mounted in the slots 11, the other-side end of one slot-held portion 41 and the other-side end of another slot-held portion 41 are connected (soldered) together to form a coil end portion. For example, the other-side end of the slot-held portion 41 of one segment conductor 40 may be connected to the other-side end of the slot-held portion 41 of another segment conductor 40, so that the coil 30 in a wave winding configuration is formed. With the coil 30 in a wave winding configuration, it is possible to reduce the size of (to simplify) the coil end portions of the coil 30, compared to when lead wires of a coil formed in a concentric winding configuration are connected to each other above coil end portions thereof.

(Stator Manufacturing Method)

Next, a method of manufacturing the stator 1 is described.

Figure 5:
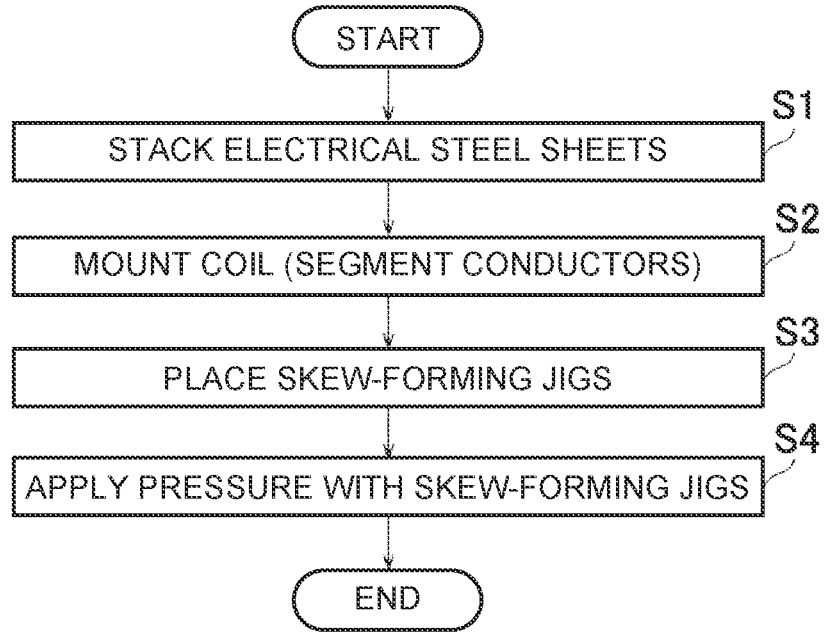
FIG. 5 is a flowchart of a stator manufacturing method according to the first embodiment.
Figure 6:
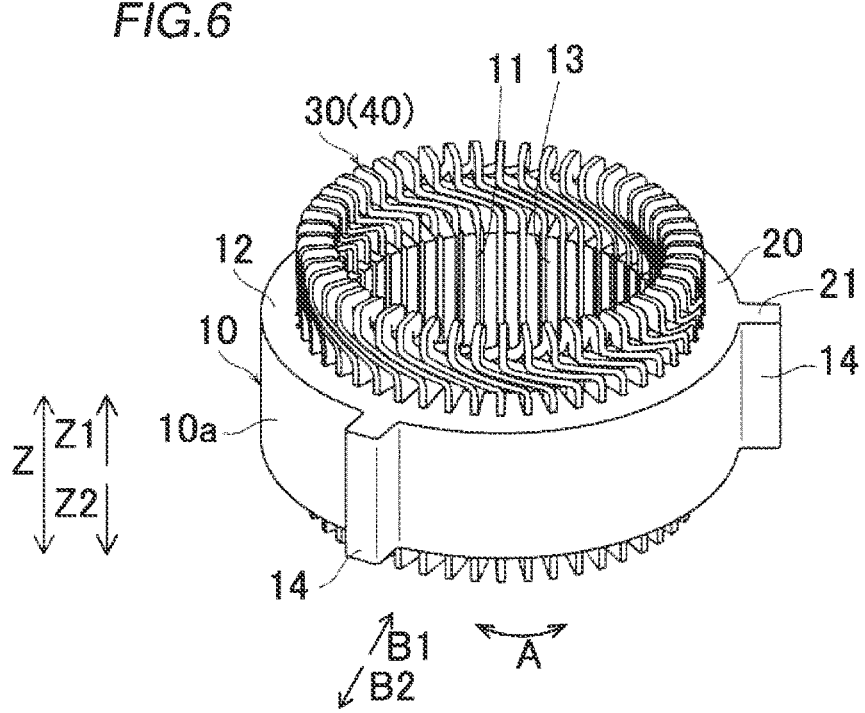
FIG. 6 is a first diagram explaining the stator manufacturing method according to the first embodiment.

First, as illustrated in FIG. 5, in step S1, a stator core 10 is formed by stacking multiple electrical steel sheets 20. Specifically, as illustrated in FIG. 6, multiple electrical steel sheets 20 that are identical in shape are stacked. More specifically, the multiple electrical steel sheets 20 are stacked such that their respective ear portions 21 are aligned along the axial direction. Thus, protrusion portions 14 that are linear (prismatic) in shape along the axial direction are formed. Three protrusion portions 14 are formed. At this stage, slots 11 and teeth 13 are each formed in a linear shape along the axial direction. Further, stacking the multiple electrical steel sheets 20 forms the protrusion portions 14 in a linear shape.

Then, in step S2, a coil 30 is mounted in the slots 11 of the stator core 10. Specifically, segment conductors 40 are mounted in the slots 11. As illustrated in FIG. 4, at this stage, slot-held portions 41 of the segment conductor 40 are formed in a linear shape along the axial direction. The segment conductor 40 is inserted in the slots 11 from the other-side ends (opposite to a coil end portion 42) of the slot-held portions 41 by being moved along the axial direction. Since the segment conductor 40 has the coil end portion 42 at a one-side end thereof in the axial direction, the coil end portion 42 straddles the teeth 13 to prevent detachment (to limit movement) of the segment conductor 40 from the slots 11.

Figure 7:
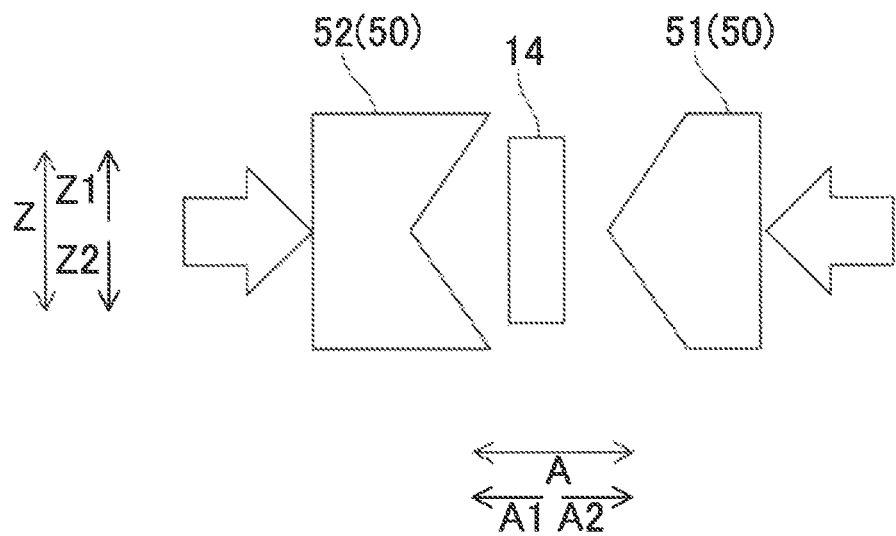
FIG. 7 is a second diagram explaining the stator manufacturing method according to the first embodiment.

Next, in step S3, according to the first embodiment, as illustrated in FIG. 7, the protrusion portions 14 are pressed along the circumferential direction while a skew-forming jig 50 having a bent shape corresponding to a skew of the stator core 10 is placed. The skew-forming jig 50 includes the following: a skew-forming jig 51 having a bent shape that projects in the circumferential direction to correspond to the skew; and a skew-forming jig 52 having a bent shape that is recessed in the circumferential direction to correspond to the skew. That is, the skew-forming jig 51 is structured to project in a V-shape in one circumferential direction (in the A1 direction). On the other hand, the skew-forming jig 52 is structured to be recessed in a V-shape in one circumferential direction (in the A1 direction). Further, the skew-forming jig 51 and the skew-forming jig 52 are each structured from a plate-like metal member. In addition, the V-shape of the skew-forming jig 51 and the V-shape of the skew-forming jig 52 match each other. That is, when the skew-forming jig 52 is fitted on the skew-forming jig 51, the skew-forming jig 51 and the skew-forming jig 52 are in contact with each other without any clearance therebetween. The skew-forming jig 51 is one example of a "first skew-forming jig" recited in claims, and the skew-forming jig 52 is one example of a "second skew-forming jig" recited in the claims.

The skew-forming jig 51 and the skew-forming jig 52 are arranged relative to each other to sandwich the protrusion portion 14 therebetween. That is, in the circumferential direction, the skew-forming jig 51 is arranged on the A2-direction side relative to the protrusion portion 14, and the skew-forming jig 52 is arranged on the A1-direction side relative to the protrusion portion 14. As many (three) pairs (couples) of the skew-forming jig 51 and the skew-forming jig 52 as the protrusion portions 14 are provided. Each of the three pairs (couples) of the skew-forming jig 51 and the skew-forming jig 52 is arranged to sandwich a corresponding one of the protrusion portions 14 therebetween.

Then, in step S4, after the coil 30 (the segment conductors 40) is mounted in the slots 11 of the stator core 10, the protrusion portions 14 on the outer circumferential surface 10a of the stator core 10 are pressed by the skew-forming jigs 51 and 52 so that the electrical steel sheets 20 structuring the stator core 10 are gradually displaced from each other in the circumferential direction. Thus, a skew having a bent shape is formed to the slots 11 (the slots 11 are skewed). Specifically, the protrusion portion 14 is pressed by bringing the skew-forming jig 51 and the skew-forming jig 52 close to each other with the protrusion portion 14 sandwiched between the skew-forming jig 51 and the skew-forming jig 52. Thus, the protrusion portions 14 having a linear shape before formation of the skew are formed into the same shape as the slots 11 that are deformed into a bent shape or a curved shape after formation of the skew. Specifically, a V-shaped skew corresponding to the shapes of the skew-forming jig 51 and the skew-forming jig 52 is formed on the stator core 10. Both the skew-forming jig 51 and 52 may be moved toward each other in the circumferential direction. Alternatively, one of the skew-forming jig 51 and 52 may be fixed in position while the other is moved.

Further, according to the first embodiment, the multiple protrusion portions 14 on the outer circumferential surface 10a of the stator core 10 are pressed simultaneously by the multiple skew-forming jigs 50 (multiple couples of the skew-forming jigs 51 and 52) to form the skew.

Further, as the stator core 10 is skewed, the linear slot-held portions 41 of the coil 30 mounted in the linear slots 11 before formation of the skew are formed into a shape corresponding to a shape of the slots 11 that are deformed into a bent shape or a curved shape after formation of the skew. Specifically, as the stator core 10 is skewed, the slots 11, the teeth 13, and the coil 30 (the segment conductors 40) arranged in the slots 11 are all deformed into a V-shape. Heating the coil 30 (the segment conductors 40) makes the coil 30 (the segment conductors 40) soft, thus making it possible to deform the coil 30 (the segment conductors 40) by a relatively small force.

After that, the other ends of the slot-held portions 41 of the segment conductors 40 are connected together, and thus the stator 1 is completed. The protrusion portions 14 may be cut off after the stator 1 is completed or may be used as keys for stopping rotation of the stator 1 relative to a housing. When the protrusion portions 14 are cut off after the stator 1 is completed, an annular member is fitted to the outside of the stator core 10. Thus, the stator core 10 (the electrical steel sheets 20) is fixed.

[Second Embodiment]
(Stator Structure)

Figure 8:
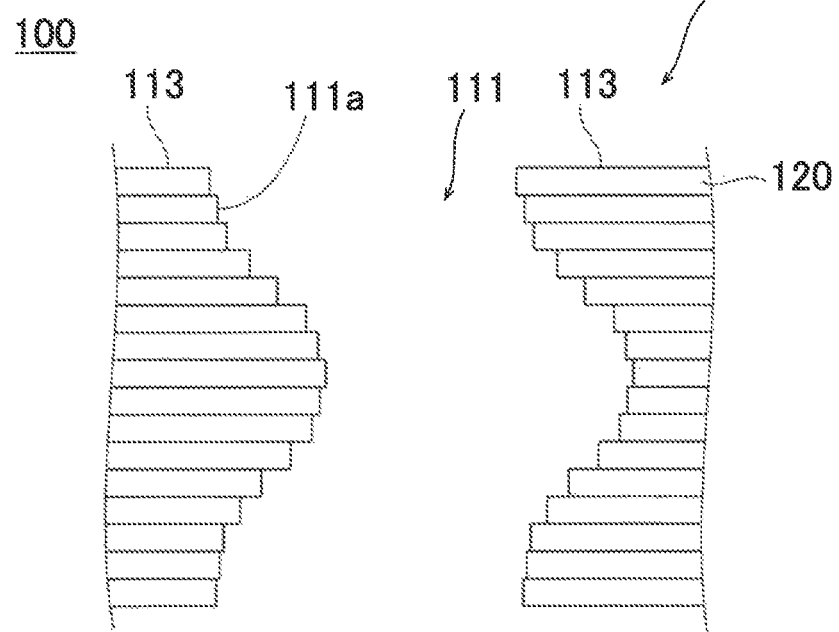
FIG. 8 is a schematic diagram of a coil mounted in a slot according to a second embodiment.

With reference to FIGS. 8 and 9, the structure of a stator 100 according to a second embodiment is described. According to the second embodiment, a skew having a curved shape that changes smoothly is formed on a stator core 110.

As illustrated in FIG. 8, according to the second embodiment, a skew having a curved shape that changes smoothly when viewed in the radial direction of the stator core 110 is formed on the stator 100 (the stator core 110). Specifically, multiple electrical steel sheets 120 are displaced from each other in the circumferential direction such that side walls 111a of slots 111 of the stator core 110 (a pair of side walls 111a opposing each other in the circumferential direction) have smooth curved surfaces along the axial direction. This smooths a change in angle of the side walls 111a of the slots 111 in the axial direction. For example, the amount of displacement of the electrical steel sheets 120 in the circumferential direction is relatively small near one end (and the other end) of the stator core 110 in the axial direction. The amount of displacement of the electrical steel sheets 120 in the circumferential direction gradually increases with decreasing distance to the center of the stator core 110 in the axial direction. Then, in the proximity of the center of the stator core 110 in the axial direction, the amount of displacement of the electrical steel sheets 120 in the circumferential direction gradually decreases. Thus, a skew having a curved shape that changes smoothly is formed.

For example, the radius of curvature of the skew (the side walls 111a of the slot 111) is equal to or greater than the minimum bend radius of a flat conductive wire 40a. The minimum bend radius refers to the smallest radius that the flat conductive wire 40a is allowed to be bent without damaging an insulation layer of the flat conductive wire 40a.

Further, as the skew having a curved shape that changes smoothly is formed on the stator core 110, the slots 111 and teeth 113 are formed into a curved shape that changes smoothly. In addition, a coil 30 (slot-held portions 41) mounted in the slots 111 is formed (deformed) into a curved shape that changes smoothly.

As illustrated in FIG. 9, a skew-forming jig 150 includes the following: a skew-forming jig 151 having a curved shape that projects in the circumferential direction while changing smoothly to correspond to the skew having a curved shape that changes smoothly; and a skew-forming jig 152 having a curved shape that is recessed in the circumferential direction while changing smoothly to correspond to the skew having a curved shape that changes smoothly. A protrusion portion 114 that is linear in shape and extends along the axial direction before formation of the skew is pressed by being sandwiched from both sides by the skew-forming jigs 151 and 152 so that the skew having a curved shape that changes smoothly is formed. The protrusion portion 114 is one example of a "skew forming mechanism portion" recited in the claims. The skew-forming jig 151 is one example of a "first skew-forming jig" recited in claims, and the skew-forming jig 152 is one example of a "second skew-forming jig" recited in the claims.

The other structures and manufacturing method according to the second embodiment are the same as those according to the first embodiment.

[Third Embodiment]
(Stator Structure)

With reference to FIGS. 10 to 17, the structure of a stator 200 according to a third embodiment is described. According to the third embodiment, a stator core 210 is provided with hole portions 214a that are used to form a skew. The hole portions 214a are one example of a "skew forming mechanism portion" recited in the claims.

Figure 11:
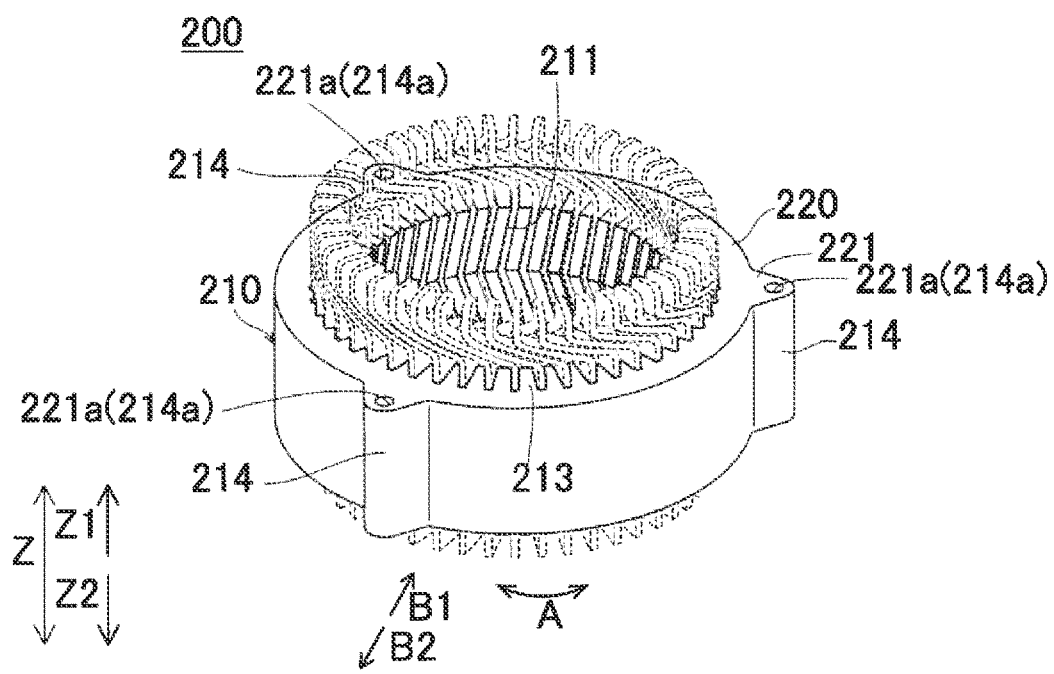
FIG. 11 is a perspective view of a stator core (electrical steel sheets) according to the third embodiment.

As illustrated in FIG. 10 and FIG. 11, the stator core 210 of the stator 200 according to the third embodiment is formed by stacking multiple electrical steel sheets 220. The electrical steel sheets 220 include an ear portion 221 that protrudes toward the outer diameter side. The ear portion 221 is provided with a circular hole portion 221a. Specifically, multiple (three in the third embodiment) ear portions 221 are provided. The three ear portions 221 are spaced from each other at equal angular intervals. By stacking the multiple electrical steel sheets 220, the ear portions 21 are stacked and thus form protrusion portions 214. Further, by stacking the multiple electrical steel sheets 220, the hole portions 221a are connected and thus form the hole portions 214a that are through-holes. The hole portions 214a are formed in a linear shape along the axial direction. After the stator 200 is completed, the hole portions 214a may be used as hole portions 214a in which bolts for fixing the stator 200 to a housing or the like are inserted.

The stator core 210 is provided with a V-shaped skew as in the first embodiment. Further, slots 211 and teeth 213 are deformed in a V-shape. A coil 30 (slot-held portions 41) are also deformed in a V-shape.

Further, as illustrated in FIG. 11, the multiple electrical steel sheets 220 are not identical in shape to each other. Specifically, after the multiple electrical steel sheets 220 are stacked, the hole portions 221a in the ear portions 221 are all in the same position in the circumferential direction. On the other hand, after the multiple electrical steel sheets 220 are stacked, portions of the electrical steel sheets 220 corresponding to the slots 211 in the circumferential direction are gradually displaced in position from each other in the circumferential direction. Thus, the slots 211 and the teeth 213 are structured in a V-shape.

(Stator Manufacturing Method)

Next, a method of manufacturing the stator 200 according to the third embodiment is described.

Figure 12:
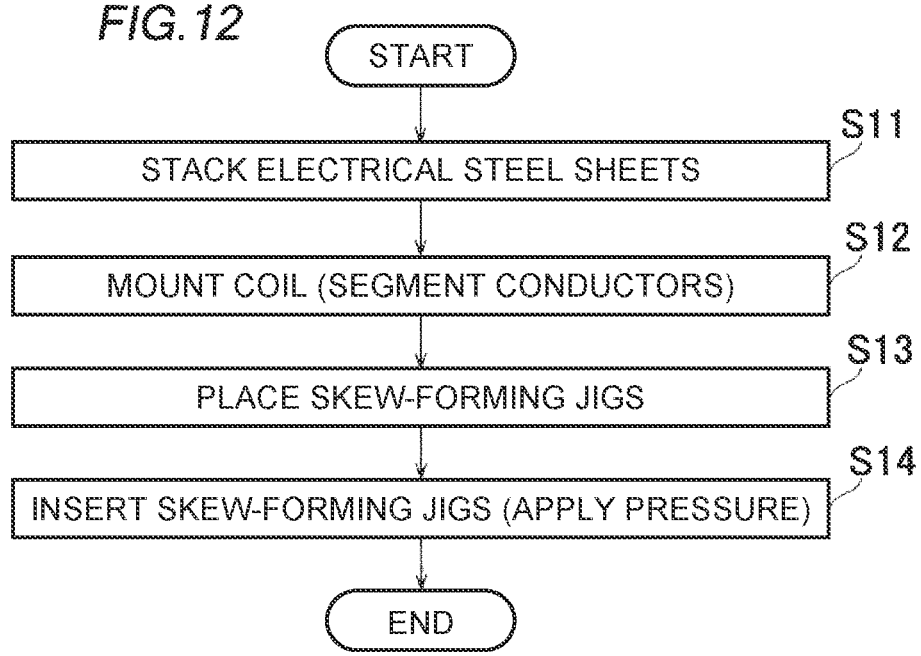
FIG. 12 is a flowchart of a stator manufacturing method according to the third embodiment.

First, as illustrated in FIG. 12, in step S11, a stator core 210 (refer to FIG. 13) is formed by stacking multiple electrical steel sheets 220. In this step, the multiple electrical steel sheets 220 are stacked such that portions of the multiple electrical steel sheets 220 corresponding to slots 211 are all in the same position in the circumferential direction. Thus, the slots 211 and teeth 213 are formed in a linear shape along the axial direction. On the other hand, according to the third embodiment, hole portions 214a in the stacked multiple electrical steel sheets 220 have a bent shape corresponding to the shape of a skew (the shape of a skew of the stator core 210 that is completed). Specifically, as illustrated in FIG. 14, the hole portions 214a are each bent in a V-shape when viewed in the radial direction. FIG. 14 illustrates when the hole portion 214a is viewed from the inner diameter side of the stator core 210.

Next, in step S12, a coil 30 (multiple segment conductors 40) is mounted in the slots 211 of the stator core 210. It is noted that step S12 is the same as step S2 in the first embodiment.

Figure 13:
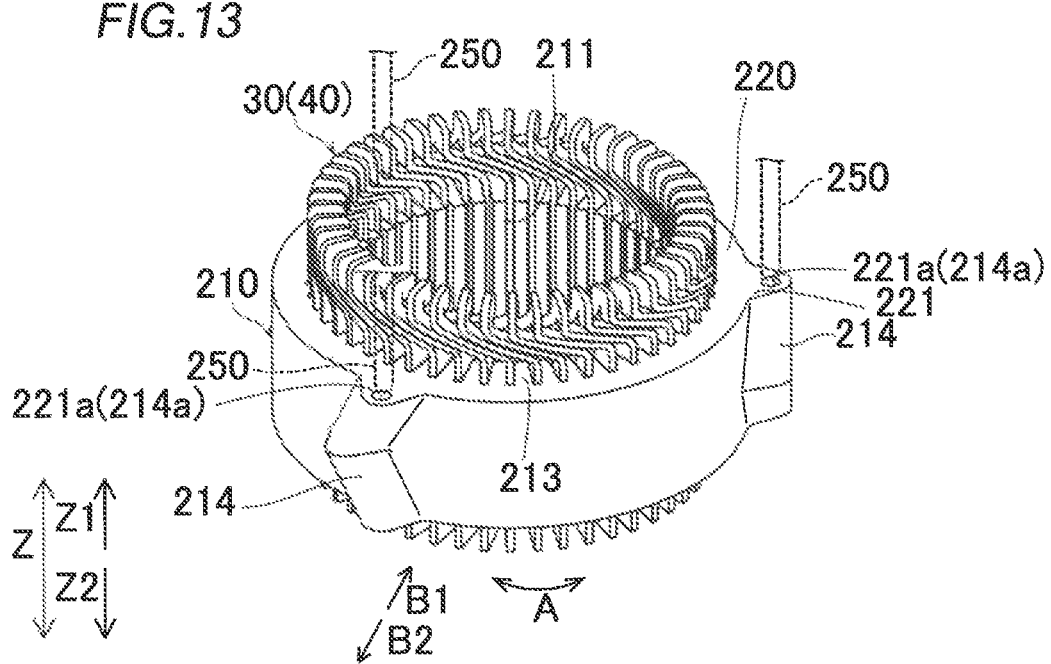
FIG. 13 is a first diagram explaining the stator manufacturing method according to the third embodiment.
Figure 14:
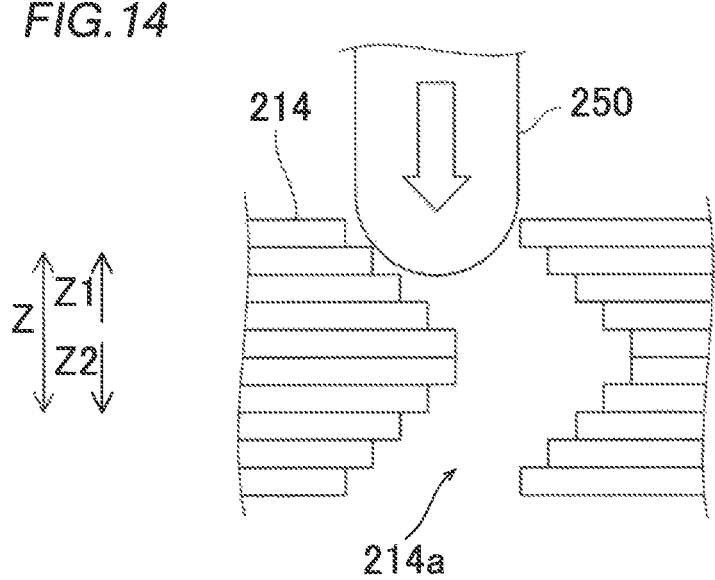
FIG. 14 is a second diagram explaining the stator manufacturing method according to the third embodiment.

Then, in step S13, according to the third embodiment, as illustrated in FIG. 13, skew-forming jigs 250 having a linear, rod-like shape are placed just above the hole portions 214a. Multiple skew-forming jigs 250 are provided corresponding to the multiple hole portions 214a. Further, as illustrated in FIG. 14, the tips of the skew-forming jigs 250 are each formed in a shape similar to a hemisphere to reduce damage to the hole portions 214a caused by contact with the hole portions 214a.

Figure 15:
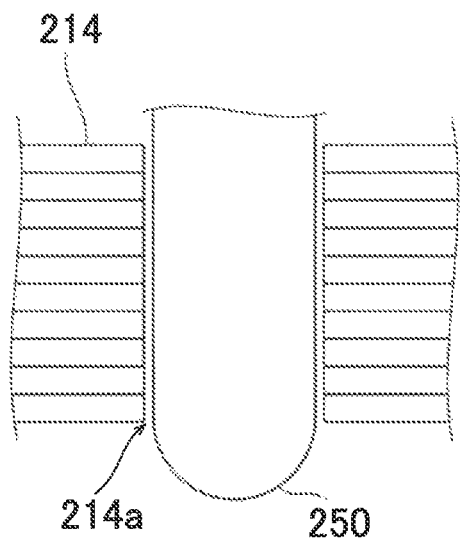
FIG. 15 is a third diagram explaining the stator manufacturing method according to the third embodiment.
Figure 16:
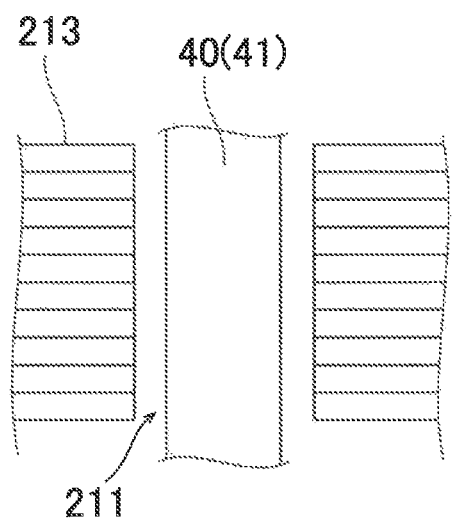
FIG. 16 is a fourth diagram explaining the stator manufacturing method according to the third embodiment.
Figure 17:
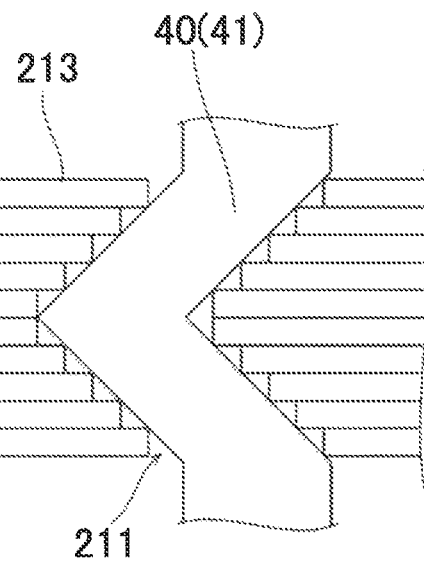
FIG. 17 is a fifth diagram explaining the stator manufacturing method according to the third embodiment.

Next, in step S14, according to the third embodiment, as illustrated in FIG. 15, the skew-forming jigs 250 each having a linear, rod-like shape are inserted (pressed) into the hole portions 214a along the axial direction. Specifically, the multiple skew-forming jigs 250 are simultaneously inserted into the hole portions 214a. Thus, the multiple electrical steel sheets 220, which structure the stator core 210, are gradually displaced from each other in the circumferential direction. Finally, the hole portions 214a are each formed in a linear shape along the axial direction. As a result, a skew having a bent shape corresponding to the bent shape of the hole portions 214a before the multiple electrical steel sheets 220 are displaced in the circumferential direction is formed on the stator core 210. Specifically, a V-shaped skew is formed on the stator core 210. Thus, the slots 211 and teeth 213 that are linear in shape along the axial direction as illustrated in FIG. 16 are deformed into a V-shape as illustrated in FIG. 17. Accordingly, the coil 30 (the slot-held portions 41) mounted in the slots 211 is also deformed into a V-shape.

The skew-forming jigs 250 may be inserted into the hole portions 214a by being moved downward with the stator core 210 fixed in position. Alternatively, the skew-forming jigs 250 may be inserted into the hole portions 214a by moving the stator core 210 toward the skew-forming jigs 250 with the skew-forming jigs 250 fixed in position. Still alternatively, the skew-forming jigs 250 may be inserted into the hole portions 214a by moving both the skew-forming jigs 250 and the stator core 210 toward each other.

The other structures and manufacturing method according to the third embodiment are the same as those according to the first embodiment.

[Effects of the First to Third Embodiments]

The first to third embodiments have the following effects.

According to the first to third embodiments, as described above, after a coil (30) is mounted in slots (11, 111, 211) of a stator core (10, 110, 210), a skew-forming mechanism portion (14, 114, 214a) is pressed by a skew-forming jig (50, 150, 250). Thus, since one of the skew-forming mechanism portion (14, 114, 214a) and the skew-forming jig (50, 150, 250) has a bent shape or a curved shape corresponding to the shape of a skew, multiple electrical steel sheets (20, 120, 220) that structure the stator core (10, 110, 210) are gradually displaced from each other in the circumferential direction in a bent shape or a curved shape to follow the bent shape or the curved shape of the one of the skew-forming mechanism portion (14, 114, 214a) and the skew-forming jig (50, 150, 250). As a result, a bent or curved skew is formed on the stator core (10, 110, 210). Accordingly, the slots (11, 111, 211) and the coil (30) mounted in the slots (11, 111, 211) are also deformed in a bent shape or a curved shape to correspond to the skew on the stator core (10, 110, 210). This allows both ends on one side and the other side of slot-held portions (41) to be located on one side or the other side in the circumferential direction, thus making it possible to reduce a difference in magnitude between electromagnetic force from one-side ends of the slot-held portions (41) and electromagnetic force from the other-side ends of the slot-held portions (41) in the axial direction. Therefore, vibration in a direction along the axial direction is reduced. Further, since a bent or curved skew is formed on the stator core (10, 110, 210), a change in electromagnetic force to the slot-held portions (41) in the circumferential direction is smaller than when the slot-held portions (41) of the coil (30) are mounted along the axial direction (when no skew is formed). Therefore, vibration in a direction along the circumferential direction or the radial direction is reduced. From these results, it is possible to reduce vibration in a direction along the axial direction, in addition to vibration in a direction along the circumferential direction or the radial direction. Further, this reduces a change in electromagnetic force to the slot-held portions (41) in the circumferential direction, thus making it possible to reduce eddy current (iron loss) generated in the coil (30) and to reduce harmonics that cause torque ripple and vibration noise.

According to the second embodiment, as described above, the skew is formed in a curved shape that changes smoothly when viewed in the radial direction of the stator core (110). This structure allows side walls (111a) of the slots (111) to have smooth curved surfaces, thus making it possible to reduce damage to insulation coverings of flat conductive wires (41a) that structure the coil (30) (damage to insulation paper located in the slots (111)), caused by contact of the insulation coverings with corner portions of the slots (111) during deformation of the coil (30). If the flat conductive wires (41a) are bent at a relatively small angle, the insulation coverings may be wrinkled although the insulation coverings may be undamaged. In this case, a partial discharge may occur from the flat conductive wires (41a). When the skew on the stator core (110) is formed in a curved shape that changes smoothly as described in the second embodiment, it is possible to prevent the flat conductive wires (41a) from being wrinkled and thus to prevent a partial discharge from occurring from the flat conductive wires (41a). Further, the skew having a curved shape that changes smoothly is capable of suppressing vibration in the axial direction more effectively than a skew having a V-shape or the like (a skew having a corner portion). It is noted that the "partial discharge" means that a local discharge occurs due to electric field concentration caused by voids or the like.

According to the first and third embodiments, as described above, one of the skew-forming mechanism portion (14, 214a) and the skew-forming jig (50, 250) has a V-shape corresponding to the shape of the skew so as to form the skew in a V-shape when viewed in the radial direction of the stator core (10, 210). This structure makes the V-shaped skew symmetric with respect to a line segment (P) that is perpendicular to the axial direction, thus making it possible to effectively reduce a difference in magnitude between electromagnetic force from one end of the slot-held portions (41) and electromagnetic force from the other end of the slot-held portions (41) in the axial direction. As a result, it is possible to effectively reduce vibration in a direction along the axial direction.

According to the first and second embodiments, as described above, a skew having a bent shape or a curved shape is formed by pressing a protrusion portion (14, 114) provided on the outer circumferential surface (10a) of the stator core (10, 110) along the circumferential direction with a skew-forming jig (50, 150) having a bent shape or a curved shape corresponding to the shape of the skew so that multiple electrical steel sheets (20, 120) structuring a stator core (10, 110) are gradually displaced from each other in the circumferential direction. This structure requires only that the protrusion portion (14, 114) be pressed by the skew-forming jig (50, 150) having a bent shape or a curved shape corresponding to the shape of the skew, thus making it possible to easily form the skew having a bent shape or a curved shape. Assuming that a skew is formed by providing the outer circumferential surface (10a) of the stator core (10, 110) with a groove portion having a linear shape, by placing a jig having a linear, rod-like shape in the groove portion, and then by twisting the jig, the skew may be formed in an inclined linear shape. However, it is difficult to form a bent skew using this method.

A step of forming a skew according to the first and second embodiments includes, as described above, pressing a skew-forming mechanism portion (14, 114) with a first skew-forming jig (51, 151) and a second skew-forming jig (52, 152) while sandwiching a protrusion portion (14, 114) between the first skew-forming jig (51, 151) and the second skew-forming jig (52, 152), so that multiple electrical steel sheets (20, 120) that structure a stator core (10, 110) are gradually displaced from each other in the circumferential direction to form a skew having a bent shape or a curved shape. This structure makes it possible to reduce a force that needs to be applied to each of the first skew-forming jig (51, 151) and the second skew-forming jig (52, 152) to form the skew, compared to when the protrusion portion (14, 114) is pressed in the circumferential direction using only one of the first skew-forming jig (51, 151) and the second skew-forming jig (52, 152). Thus, it is possible to form the skew by using a pressing apparatus that is capable of applying a relatively small amount of pressure (mechanism for moving the skew-forming jig (50, 150)).

According to the third embodiment, as described above, a skew having a bent shape is formed by inserting a skew-forming jig (250) having a linear, rod-like shape into a hole portion (214a) provided on the outer circumferential surface (10a) of a stator core (210) along the axial direction so that multiple electrical steel sheets (220) structuring the stator core (210) are gradually displaced from each other in the circumferential direction. This structure requires only that the skew-forming jig (250) having a linear, rod-like shape be inserted (pressed along the axial direction) into the hole portion (214a), thus making it possible to easily form the skew having a bent shape. Further, since the skew-forming jig (250) having a linear, rod-like shape is moved along the axial direction, the skew having a bent shape can be formed by a relatively simple movement of the skew-forming jig (250). Thus, it is possible to simplify a mechanism for moving the skew-forming jig (250).

According to the first to third embodiments, as described above, a skew having a bent shape or a curved shape is formed by simultaneously pressing, after a coil (30) is mounted in slots (11, 111, 211) of a stator core (10, 110, 210), multiple skew-forming mechanism portions (14, 114, 214a) provided on the outer circumferential surface (10a) of the stator core (10, 110, 210) with multiple skew-forming jigs (50, 150, 250) such that multiple electrical steel sheets (20, 120, 220) structuring a stator core (10, 110, 210) are gradually displaced from each other in the circumferential direction. This structure makes it possible to reduce a force that needs to be applied to each of the multiple skew-forming jigs (50, 150, 250) to form the skew, compared to when one skew-forming jig (50, 150, 250) is used to apply pressure. Thus, it is possible to form the skew by using a pressing apparatus that is capable of applying a relatively small amount of pressure (mechanism for moving the skew-forming jigs (50, 150, 250)).

According to the first embodiment, as described above, slots (11) having a linear shape is formed by staking multiple electrical steel sheets (20), and then a skew having a bent shape or a curved shape is formed to the slots (11). This structure makes it possible to easily stack multiple electrical steel sheets (20), compared to when multiple electrical steel sheets (20) are stacked such that a skew is formed.

According to the first embodiment, as described above, slot-held portions (41) of a coil (30) that have a linear shape and that are held in linear slots (11) before formation of a skew are formed into a shape corresponding to a shape of the slots (11) that are deformed into a bent shape or a curved shape after formation of the skew. In this structure, the slots (11) have a linear shape before formation of the skew, and thus it is possible to easily mount the linear slot-held portions (41) into the slots (11).

According to the first embodiment, as described above, a linear skew-forming mechanism portion (14) before formation of a skew is formed into a shape identical to a shape of slots (11) that are deformed into a bent shape or a curved shape after formation of the skew. This structure makes it possible that a skew having a desired shape is formed to the slots (11) just by deforming the skew-forming mechanism portion (14).

[Modifications]

The embodiment disclosed above is to be considered in all respects as illustrative and not restrictive. The scope of the invention is defined by the claims, not the description of the embodiments, and includes all changes (modifications) that fall within the scope of the claims and the equivalents thereof.

For example, although the first to third embodiments illustrate that the outer circumferential surface of a stator core is provided with a protrusion portion (a hole portion), the preferred embodiment is not limited to this. For example, the inner circumferential surface of a stator core may be provided with a protrusion portion (a hole portion). In this case, the stator structures part of an outer-rotor-type rotating electric machine. Further, teeth protrude from an annular back yoke toward the outer diameter side, and slots are open toward the outer diameter side. Furthermore, the inner circumferential surface of the annular yoke is provided with a protrusion portion (a hole portion) that is used to form a skew.

Figure 18:
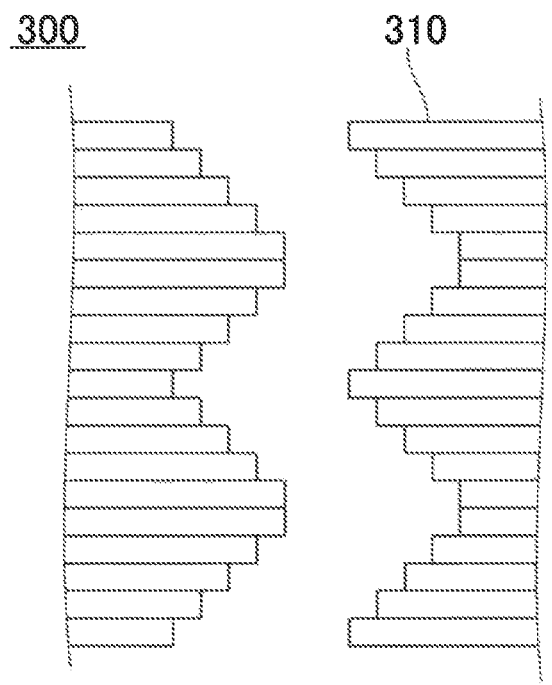
FIG. 18 is a schematic diagram of a stator according to a first modification.
Figure 19:
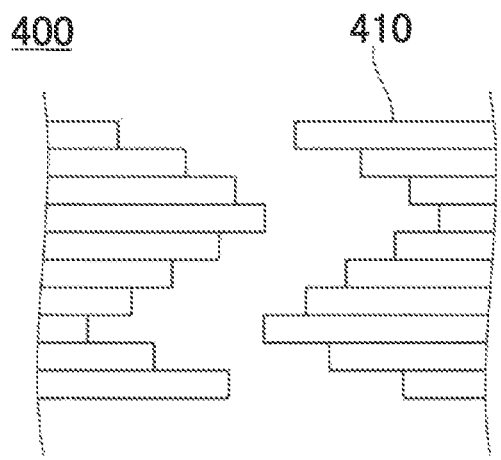
FIG. 19 is a schematic diagram of a stator according to a second modification.
Figure 20:
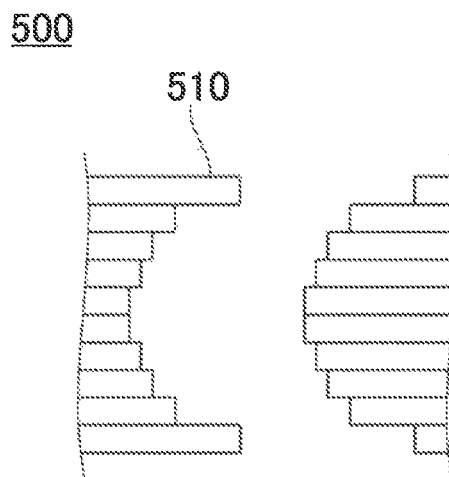
FIG. 20 is a schematic diagram of a stator according to a third modification.

Although the first and second embodiments illustrate that a skew formed on a stator core has a V-shape when viewed in the radial direction of the stator core, the preferred embodiment is not limited to this. For example, like a stator 300 according to a first modification illustrated in FIG. 18, a skew having an W-shape may be formed on a stator core 310. This makes it possible to reduce an increase in difference in magnitude of electromagnetic force at ends on one side and the other side of the stator core 310 in the axial direction, when the stator core 310 has a relatively longer length in the axial direction. Alternatively, like a stator 400 according to a second modification illustrated in FIG. 19, a skew having an N-shape may be formed on a stator core 410. Alternatively, like a stator 500 according to a third modification illustrated in FIG. 20, a skew having an U-shape (a curved shape) may be formed on a stator core 510. A skew having a W-shape, an N-shape, or a U-shape like those described in the modifications is formed by pressing a protrusion portion having a linear shape like the one described in the first embodiment with a skew-forming jig having a W-shape, an N-shape, or a U-shape. Alternatively, such a skew having a W-shape, an N-shape, or a U-shape may be formed by forming the hole portion, which is a though hole, described in the third embodiment into a W-shape, an N-shape, or U-shape, and then by inserting a skew-forming jig having a linear shape into the hole portion.

Figure 21:
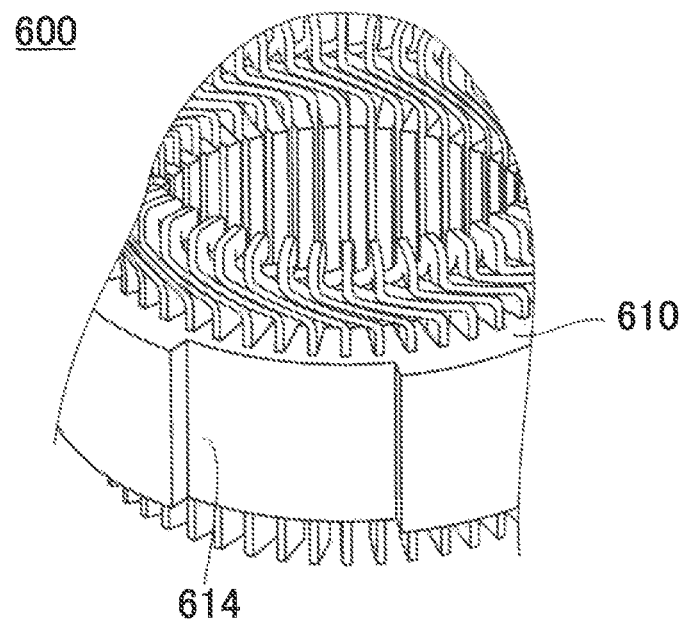
FIG. 21 is a schematic diagram of a stator according to a fourth modification.

Although the first and second embodiments illustrate that the outer circumferential surface of a stator core is provided with a protrusion portion that is used to form a skew, the preferred embodiment is not limited to this. For example, like a stator 600 according to a fourth modification illustrated in FIG. 21, a stator core 610 may be provided with a groove portion 614. The groove portion 614 has a linear shape along the axial direction before formation of a skew. The groove portion 614 is pressed in the circumferential direction by a skew-forming jig having a V-shape and is thus deformed into a bent shape (a V-shape) after formation of the skew. The groove portion 614 may be used as a key groove for stopping rotation of the stator 600 relative to a housing. The groove portion 614 is one example of a "skew-forming mechanism portion" recited in the claims.

Figure 22:
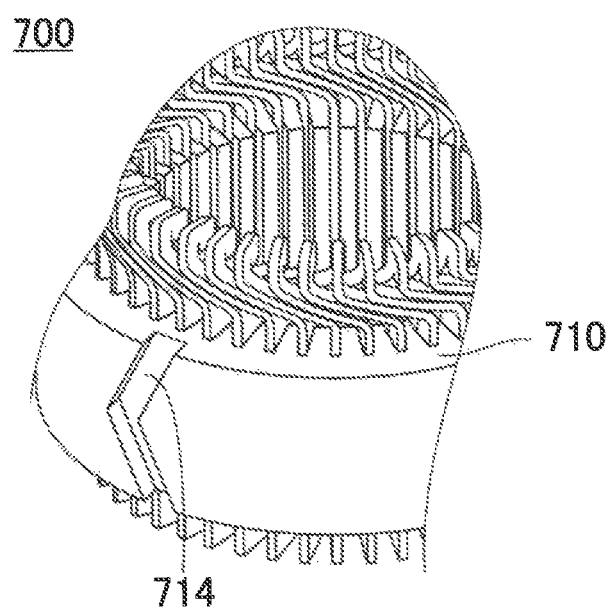
FIG. 22 is a schematic diagram of a stator according to a fifth modification.

Although the third embodiment illustrates that the outer circumferential surface (an ear portion) of a stator core is provided with a hole portion that is used to form a skew, the preferred embodiment is not limited to this. For example, like a stator 700 according to a fifth modification illustrated in FIG. 22, a stator core 710 may be provided with a groove portion 714. The groove portion 714, before formation of a skew, has a bent shape (a V-shape) corresponding to the shape of the skew. A skew-forming jig having a linear, rod-like shape is inserted in the groove portion 714 along the axial direction, and thus the groove portion 714 is deformed in a linear shape along the axial direction after formation of the skew. The groove portion 714 is one example of a "skew-forming mechanism portion" recited in the claims.

Figure 23:
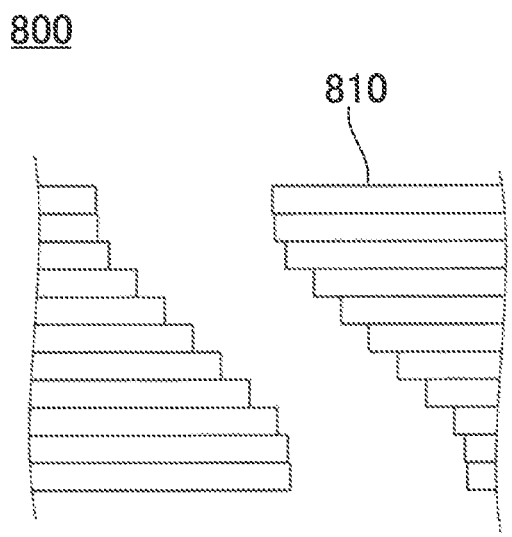
FIG. 23 is a schematic diagram of a stator according to a sixth modification.

Alternatively, like a stator 800 according to a sixth modification illustrated in FIG. 23, a stator core 810 may be provided with a skew that has a curved shape (a radius of curvature) near the axial ends and that has a linear shape in the remaining portion. This causes the axial end portions having a curved shape (a radius of curvature) to structure a stopper for stopping coil segment coils from coming off.

Although the first to third embodiments illustrate that a stator core is provided with three protrusion portions or hole portions (skew-forming mechanism portions) and that three skew-forming jigs are provided, the preferred embodiment is not limited to this. For example, the number of protrusion portions or hole portions (skew-forming mechanism portions) may be other than three.

Although the third embodiment illustrates that a skew-forming jig having a linear, rod-like shape is inserted into a hole portion from one side (the Z1-direction side) of a stator core, the preferred embodiment is not limited to this. For example, a skew-forming jig having a linear, rod-like shape may be inserted into a hole portion from both one side (the Z1-direction side) and the other side (the Z2-direction side) of a stator core.

Although the first to third embodiments illustrate that the coil is structured from flat conductive wires, the preferred embodiment is not limited to this. For example, the coil may be structured from round wires or the like.

DESCRIPTION OF THE REFERENCE NUMERALS

1, 100, 200, 300, 400, 500, 600, 700, 800: STATOR
10, 110, 210, 310, 410, 510, 610, 710, 810: STATOR CORE
11, 111, 211: SLOT
14, 114: PROTRUSION PORTION (SKEW-FORMING MECHANISM PORTION)
20, 120, 220: ELECTRICAL STEEL SHEET
30: COIL
41: SLOT-HELD PORTION
50, 150, 250: SKEW-FORMING JIG
51, 151: SKEW-FORMING JIG (FIRST SKEW-FORMING JIG)
52, 152: SKEW-FORMING JIG (SECOND SKEW-FORMING JIG)
214a: HOLE PORTION (SKEW-FORMING MECHANISM PORTION)
614: GROOVE PORTION (SKEW-FORMING MECHANISM PORTION)
714: GROOVE PORTION (SKEW-FORMING MECHANISM PORTION).

The invention claimed is:

1. A stator manufacturing method comprising:
   a step of forming a stator core by stacking a plurality of electrical steel sheets;
   a step of mounting a coil in slots of the stator core; and
   a step of forming a skew having a curved shape such that the plurality of electrical steel sheets structuring the stator core are gradually displaced in a circumferential direction, by pressing, after the coil is mounted in the slots of the stator core, a skew-forming mechanism portion provided on an outer circumferential surface or an inner circumferential surface of the stator core with a skew-forming jig, wherein
   the slots formed by gradually displacing the plurality of electrical steels sheets by forming the skew are formed such that adjacent side walls of the slots have smooth curved surfaces along a axial direction and an amount of displacement of electrical steel sheets of the plurality of electrical steel sheets at both axial ends of the stator core is smaller than an amount of displacement of electrical steels sheets of the plurality of electrical steel sheets at an axial center of the stator core,
   one of the skew-forming mechanism portion and the skew-forming jig has a curved shape to correspond to the curved shape of the skew.

2. The stator manufacturing method according to claim 1, wherein
   the step of forming the skew is a step of forming the skew having the curved shape that changes smoothly when viewed in a radial direction of the stator core.

3. The stator manufacturing method according to claim 1, wherein
   the skew-forming mechanism portion provided on the outer circumferential surface or the inner circumferential surface of the stator core includes a protrusion portion or a groove portion formed to extend along an axial direction, the skew-forming jig has the curved shape corresponding to the curved shape of the skew to press the protrusion portion or the groove portion along the circumferential direction, and
   the step of forming the skew is a step of forming the skew having the curved shape by pressing the skew-forming mechanism portion, including the protrusion portion or the groove portion, along the circumferential direction with the skew-forming jig having the curved shape corresponding to the curved shape of the skew so that the plurality of electrical steel sheets structuring the stator core are gradually displaced in the circumferential direction.

4. The stator manufacturing method according to claim 3, wherein
   the skew-forming jig includes a first skew-forming jig and a second skew-forming jig, the first skew-forming jig having a curved shape that projects in the circumferential direction to correspond to the curved shape of the skew, the second skew-forming jig having a curved shape that is recessed in the circumferential direction to correspond to the curved shape of the skew, and the step of forming the skew is a step of forming the skew having the curved shape by pressing the skew-forming mechanism portion, including the protrusion portion or the groove portion, with the first skew-forming jig and the second skew-forming jig, while sandwiching the skew-forming mechanism portion between the first skew-forming jig and the second skew-forming jig, so that the plurality of electrical steel sheets structuring the stator core are gradually displaced from each other in the circumferential direction.

5. The stator manufacturing method according to claim 1, wherein the skew-forming mechanism portion provided on the outer circumferential surface or the inner circumferential surface of the stator core includes a hole portion or a groove portion that has a curved shape corresponding to the curved shape of the skew, the skew-forming jig has a linear, rod-like shape to be inserted in the hole portion or the groove portion, and the step of forming the skew is a step of forming the skew having the curved shape by inserting the skew-forming jig having the linear, rod-like shape into the skew-forming mechanism portion, including the hole portion or the groove portion, along an axial direction so that the plurality of electrical steel sheets structuring the stator core are gradually displaced in the circumferential direction.

6. The stator manufacturing method according to claim 1, wherein a plurality of the skew-forming mechanism portions are provided, a plurality of the skew-forming jigs are provided to correspond to the plurality of the skew-forming mechanism portions, and the step of forming the skew is a step of forming the skew having the curved shape by simultaneously pressing, after the coil is mounted in the slots of the stator core, the plurality of the skew-forming mechanism portions provided on the outer circumferential surface or the inner circumferential surface of the stator core with the plurality of the skew-forming jigs so that the plurality of electrical steel sheets structuring the stator core are gradually displaced in the circumferential direction.

7. The stator manufacturing method according to claim 1, wherein the step of forming the stator core is a step of forming the slots in a linear shape by stacking the plurality of electrical steel sheets, and the step of forming the skew is a step of forming the skew having the curved shape to the slots.

8. The stator manufacturing method according to claim 7, wherein the step of forming the skew includes a step of forming slot-held portions of the coil that have a linear shape and that are held in the slots that is linear before formation of the skew, into a shape corresponding to a shape of the slots that are deformed into a curved shape after formation of the skew.

9. The stator manufacturing method according to claim 7, wherein the step of forming the stator core is a step of forming the skew-forming mechanism portion in a linear shape by stacking the plurality of electrical steel sheets, and the step of forming the skew includes a step of forming the skew-forming mechanism portion that is linear before formation of the skew, into a shape identical to a shape of the slots that are deformed into a curved shape after formation of the skew.

10. A stator comprising:

a stator core including a stack of a plurality of electrical steel sheets; and a coil mounted in slots of the stator core, wherein the slots formed in the stator core have a skew shape that or curved such that the plurality of electrical steel sheets are gradually displaced in a circumferential direction, the slots formed by gradually displacing the plurality of electrical steels sheets by forming the skew shape are formed such that adjacent side walls of the slots have smooth curved surfaces along the axial direction and an amount of displacement of electrical steel sheets of the plurality of electrical steel sheets at both axial ends of the stator core is smaller than an amount of displacement of electrical steels sheets of the plurality of electrical steel sheets at an axial center of the stator core, and an outer circumferential surface or an inner circumferential surface of the stator core is provided with a skew-forming mechanism portion that has a curved shape corresponding to the skew shape before the plurality of electrical steel sheets are displaced from each other in the circumferential direction.

* * * * *